United States Patent [19]

Nolting et al.

[11] Patent Number: 5,239,479
[45] Date of Patent: Aug. 24, 1993

[54] PROCESS FOR DETERMINING THE PRESENCE OR THE DIMENSIONS OR THE CORRECT POSITIONING OF A WORKPIECE ON A MACHINE TOOL

[75] Inventors: Klaus Nolting; Paul Wolff, both of Hanover; Manfred Wunderlich, Oerlinghausen, all of Fed. Rep. of Germany

[73] Assignee: Gildemeister Aktiengesellschaft, Fed. Rep. of Germany

[21] Appl. No.: 629,387

[22] Filed: Dec. 18, 1990

[30] Foreign Application Priority Data

Dec. 18, 1989 [DE] Fed. Rep. of Germany ....... 3941756

[51] Int. Cl.⁵ .................. G06F 15/46; G05B 19/19
[52] U.S. Cl. .................. 364/474.16; 364/474.37; 364/551.02
[58] Field of Search .............. 364/474.16, 474.37, 364/551.02, 474.34, 474.35, 474.11, 474.17, 474.12, 474.3; 340/665, 679, 680

[56] References Cited

U.S. PATENT DOCUMENTS

| | | | |
|---|---|---|---|
| 4,118,871 | 10/1978 | Kirkham | 364/474.37 |
| 4,281,385 | 7/1981 | Nakaso et al. | 364/474.34 |
| 4,328,448 | 5/1982 | Berenberg et al. | 364/474.37 |
| 4,451,892 | 5/1984 | McMurtry | |
| 4,532,599 | 7/1985 | Smith | 364/474.16 |
| 4,545,106 | 10/1985 | Juengel | 364/474.11 |
| 4,561,058 | 12/1985 | McMurtry | |
| 4,766,700 | 8/1988 | Kramberg et al. | |
| 4,866,429 | 9/1989 | Granere | 364/474.17 |

FOREIGN PATENT DOCUMENTS 3742573 3/1989 Fed. Rep. of Germany .

Primary Examiner—Jerry Smith
Assistant Examiner—Steven R. Garland
Attorney, Agent, or Firm—Scully, Scott, Murphy & Presser

[57] ABSTRACT

A process for determining the presence or the dimensions or the correct positioning of a tool which is clamped in the main clamping device of a numerically controlled machine tool opposite which a displaceable component of the machine is arranged, wherein for a displacement of the component towards the workpiece an intended position value is predetermined and the actual position value of the component is continuously determined repetitively, is further developed so that this can be done more simply. This is achieved by selecting the intended position value for the displaceable component so that a stop for the workpiece, which forms part of the displaceable component of the machine would, if a workpiece were not present, be moved to a position which, if a workpiece were present, would lie within the workpiece, and arranging for a signal to be generated if the difference between two successively determined actual position values falls below a predetermined limiting value and the intended position value has not been reached.

17 Claims, 2 Drawing Sheets

PROCESS FOR DETERMINING THE PRESENCE OR THE DIMENSIONS OR THE CORRECT POSITIONING OF A WORKPIECE ON A MACHINE TOOL

TECHNICAL FIELD OF THE INVENTION

The present invention relates to a process for determining the presence, dimensions or correct positioning of a workpiece on a machine tool.

BACKGROUND OF THE INVENTION AND PRIOR ART

Heretofore conventional processes which use the system for measuring the forward movement of machine tool carriages to measure the workpiece operate with a test probe to generate a signal which, when it is given, determines the position of the machine carriage in relation to a reference point on the machine tool. In DE-OS 31 03 166 a workpiece measuring process for a numerically controlled machine tool is disclosed with which the radius of a workpiece can be measured. For this purpose the machining tool is moved against the outer surface of the workpiece and a tape of the associated control system stores coded, digital information units which represent predetermined positions for the tip of the cutting tool. This information is supplied by a tape reader to a register via a digital computer. A feedback signal is connected to a counter, the content of which represents the instantaneous position of the cutting tip, the counter being set to zero beforehand by a signal generated when the cutting edge abuts against a reference value transmitter located on the axis of the workpiece. The register and the counter are connected to a comparator which has an output which represents the instantaneous difference between the contents of the register and of the counter. The output of the comparator generates a signal from which the radius of the workpiece is determined. The contact between the cutting tip of the tool and the workpiece is detected either by an electrical pressure sensor in the tool holder or by an electric current circuit which is closed when the tool touches the workpiece. Such arrangements are complicated and expensive, and are susceptible to faults. For example calibration of the tool is necessary before each measurement.

According to DE-OS 34 46 138 a measuring device integrated in the tailstock quill is proposed for a further NC-controlled machine tool having a tailstock. While this measuring device does not need to be removed from the working chamber during machining it only offers restricted possibilities and likewise involves considerable expense, since the tailstock does not need a measuring device of its own. The presence and the position of a workpiece in the machine can be determined by this measuring device.

Finally, a tool measuring device is disclosed in DE-OS 37 42 573 which does not require any arrangements for generating signals and uses the stroke measuring system of the machine itself to measure the tool. The signal is obtained by monitoring the contouring error of the feed drive while the tool is moved against a fixed stop. Since cutters are relatively delicate elements various measures have to be taken to prevent the cutter from being damaged on the stop. The tool correction is given by the difference between the target position and the actual position reached.

OBJECT OF THE INVENTION

It is an object of the invention a develop a process of the kind mentioned in the introduction so that it is possible to determine the presence or the dimensions or the correct positioning of a workpiece on a machine tool more simply.

SUMMARY OF THE INVENTION

In all of the processes according to the invention the signal is obtained by monitoring the feed drive, for which the electronic control device of the feed drive or its control or regulating data can be utilized, so that no special circuitry, or measuring means in the region of the workpiece or stop, is required. In this way the process can be considerably simplified and less outlay on devices for carrying out the process is necessary because additional circuitry and/or measuring means are dispensed with. All the functions of the feed drive which experience a change when the workpiece meets the stop can serve to generate the signal. The functions affected are the changing actual position value or the difference between two determined actual position values, the changing speed or speed of rotation, the changing torque and the changing acceleration or deceleration, and these quantities can therefore serve as criteria for the contact between the stop and the tool and thus also to generate a signal.

With the process according to the invention it is possible to monitor whether a workpiece is in a clamped position, e.g. in a clamping chuck, whether or not the workpiece has enough contact surface at the clamping chuck or on the clamping table or whether the dimensions of the blank allow for the subsequent machining. Since a stop with a flat surface or a flat surface of the moveable part itself can be used as the part which contacts the workpiece the problem of damage to the workpiece does not arise.

When machining bars it is possible with the process according to the invention to test whether the bar has been advanced far enough by the bar feed device for the part to be made. In the case of cast or forged pieces having a very uneven blank contour the dimensions can be determined with enough accuracy for the next cut segmentation.

In the case of a displaceable, counter clamping device or a so-called gripping or counter spindle opposite the main clamping device, the invention makes it possible to ensure that the workpiece is properly transferred from one workpiece spindle to another. So that the second side of a transferred workpiece can be accurately machined the workpieces must meet the receiving workpiece spindle at a reference surface. Heretofore when a workpiece was supplied to, for example, the main spindle by a gripping spindle mounted on the tool carriage a resilient ejector was needed to ensure adequate surface contact in the workpiece clamping chuck of the main spindle. This ejector, which impedes loading of the gripping spindle, can now be dispensed with because the proper positioning of the workpiece is checked by the process of the invention. The same applies when a workpiece is transferred from the main spindle to the counter or gripping spindle.

A workpiece handling device which has a numerically controlled feed axle for transporting the workpiece which is connected to the machine control unit can also be used as the displaceable part of the machine tool. The correct positioning of the workpiece in the clamping chuck can then likewise be determined by means of this feed axle. If a workpiece cannot be inserted into a gripping clamp, for example, because it is not wide enough open, so that it thus abuts against a wrong surface, this is detected by the feed measuring system of the machine or by the handling system.

The presence of a workpiece can also be determined when a section to be cut from a bar is taken away by a collecting device or counter spindle. After the cutting process has finished, the feed drive receives the command to move the moveable component away from the collecting position. If the cutting or separating process has not been carried out successfully, and the workpiece to be collected is still connected to the starting material, movement cannot occur and the monitoring of the actual position value, the feed speed or the torque generates an error signal.

Advantageous developments of the invention which further improve the process according to the invention are described in the subclaims.

DESCRIPTION OF THE DRAWINGS

The invention will be explained in more detail with reference to the following drawings, in which.

DETAILED DESCRIPTION OF PREFERRED EMBODIMENTS OF THE INVENTION

Figure 1:
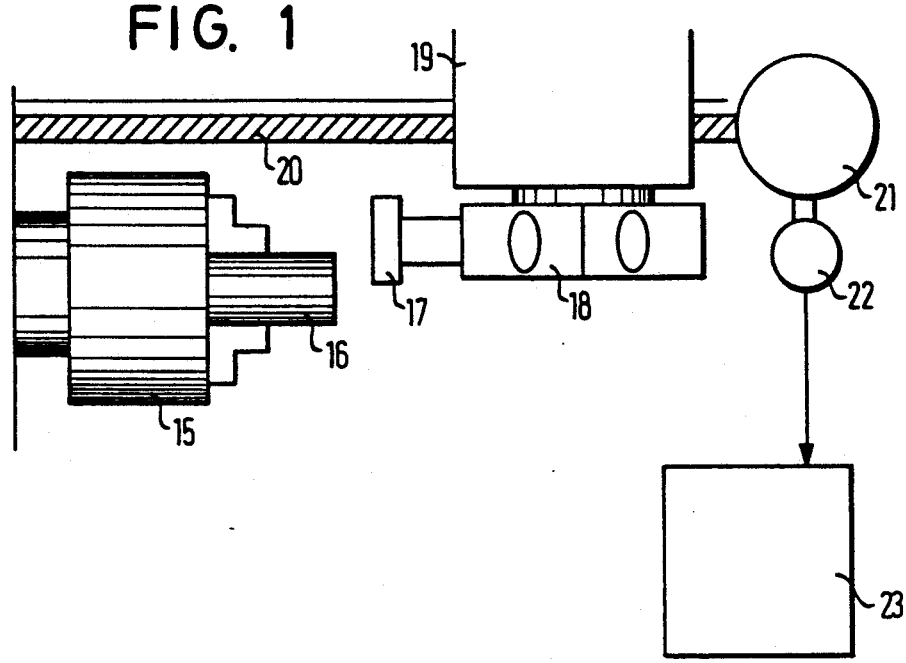
FIG. 1 shows a schematic diagram of a machine tool with a feed axle, according to the invention.

FIG. 1 shows a work spindle with a clamping chuck 15 that is holding a workpiece 16, e.g. a bar. The workpiece 16 can be machined by the tools of a turret head 18 which is mounted on a tool carriage 19 so that it can be rotated and fixed and in the respective angular position. When the turret head 18 has been swivelled into position a stop 17 opposite the clamping chuck 15 is clamped therein. The carriage 19 is mounted on the machine body of the machine tool so that it can be displaced in the direction of the workpiece spindle axis by means of a threaded spindle 20 and a feed motor 21. A measuring device 22 is connected to the feed motor 21 which determines the actual position value of the carriage 19 and supplies the measured values to a control unit 23 for further evaluation.

Figure 2:
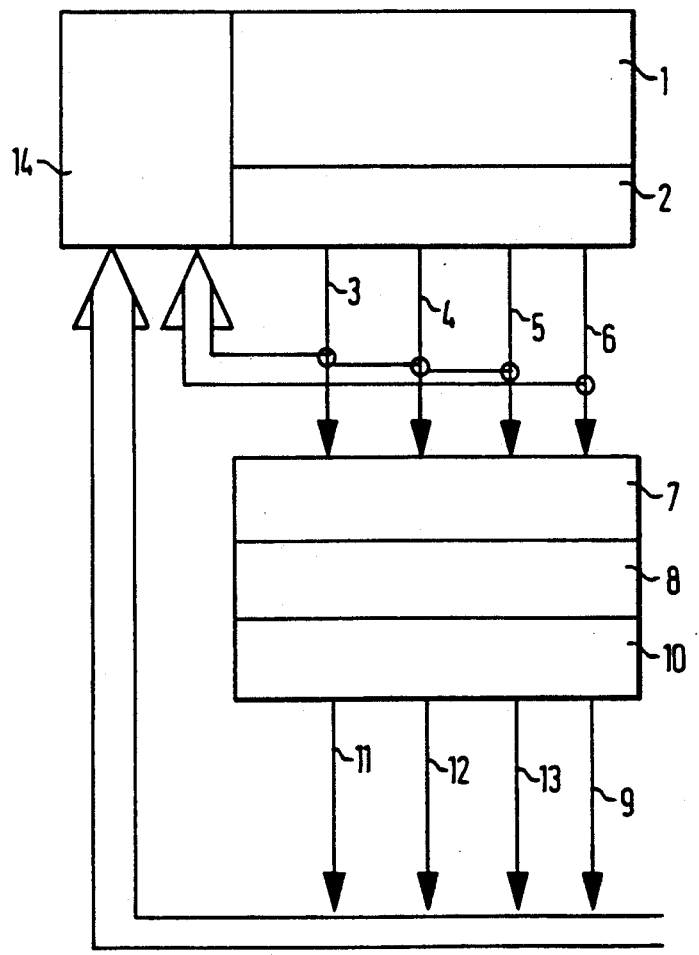
FIG. 2 shows the control means for monitoring the feed drive.

By means of an electronic control unit 1 an intended position 3 and speed 4 at which the stop 17 is to be moved towards the workpiece 16 are predetermined for the carriage 19 in the direction of the axis of the workpiece or threaded spindle 20, as shown in FIG. 2. Furthermore intended values 5, 6 can be predetermined for the acceleration and the torque.

The control unit 1 is associated with a regulating device having a control circuit with which the difference between the intended position 3 and the respective actual position of the feed of the carriage 19 or of the stop 17 is determined cyclically as a deviation. Control signals are generated which act as a regulating variable to reduce the difference.

The intended position 3 for the stop 17 is selected so that it lies in the workpiece 16 or behind the surface of the workpiece 16 facing the stop, i.e. the stop 17 cannot reach the intended position if the workpiece 16 is present.

Monitoring of the feed is activated in the control unit 1 by the operation of the regulating device. Thereafter the control unit 1 compares the actual position value 11 of the stop 17 on the longitudinal axis of the spindle with the previous actual position values cyclically in the comparator 14, and from the respective difference values determines the displacement movement of the carriage 19 and/or the stop 17. The contact between the workpiece 16 and the stop 17 is recognised in the comparator 14 because the actual position value 11 remains in a predetermined position window or region for a certain period of time or because the actual position value/difference falls below a predetermined value. Furthermore the intended position 3 is not reached, which is also recognised by the control circuit. Depending on the embodiment of the control unit 1 or the regulating device it is also possible to detect contact between the stop 17 and the workpiece 16 by monitoring the feed speed or the feed torque and by comparing the actual values or their differences with a predetermined limiting value.

If contact is detected the control unit 1 automatically makes available the current actual value 11 as the new intended position 3, whereby the contact is released from considerable pressure forces.

Another possible moment or force on the stop 17, can, depending on the design of the control unit 1, be compensated as follows: If only intended position and speed values 3, 4 are given, i.e. processed by the following drive control 7, an intended position can be predetermined by the control unit 1 which lies at an adjustable value before the contact point. As a result a certain amount of return movement of the carriage 19 is effected by the threaded spindle 20 and the actual torque value is reduced or restored. It is also possible for the control unit 1 to directly limit or control the torque of the drive, and thus the force on the stop, by means of an intended torque value 6.

Within the scope of the invention it is possible, depending on the design of the control unit, to repeatedly determine the actual torque value 9, or the actual speed of rotation value 12 or actual acceleration value, supply it to the comparator and evaluate it. From each of these signals 9, 11, 12, 13 it can be concluded whether the workpiece 16 has been reached or whether there is contact between the latter and the stop 17, as these quantities change significantly on contact between the stop 17 and the workpiece 16. Thus the torque and the braking acceleration will increase at the moment of contact and the actual speed of rotation will fall towards zero.

Figure 3:
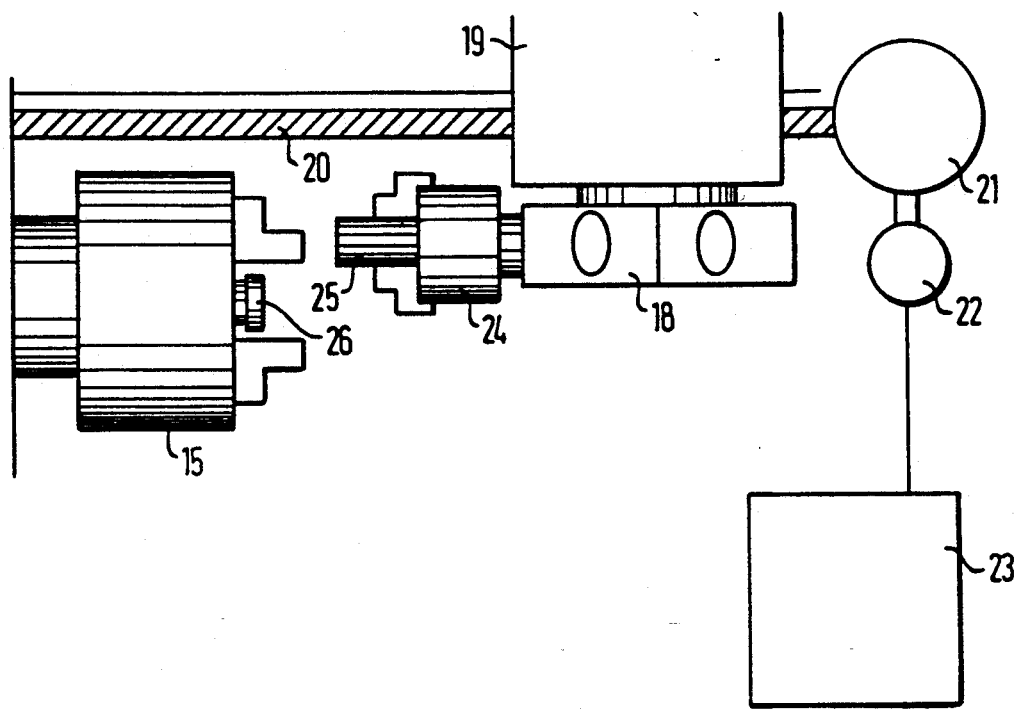
FIGS. 3 and 4 show a modified form of the machine tool shown in FIG. 1.

In the embodiment shown in FIG. 3, in which the same or similar parts have been given the same reference numerals, a counter clamping device 24, e.g. a so-called balance or counter spindle located opposite the main clamping device is associated with the machine tool. This device can advantageously be arranged on the turret head 18 and can thus be swivelled into its position opposite the main clamping device by means of the turret head 18. With the exemplary embodiment shown in FIG. 3 the carriage 19 can not only be displaced along the threaded spindle 20, as in the exemplary embodiment described above, but also at right-angles thereto (not shown), so that the turret head 18 or the counter clamping device 24 can be aligned with the main clamping device 15. A workpiece 25 that is to be machined is clamped in the counter clamping device 24 With an embodiment such as this the presence or the dimensions or the correct positioning of the workpiece 25 can again be determined. For this purpose a stop 26 is provided on the main clamping device 15, preferably coaxially on its side facing the counter clamping device 24—in this case between the gripper jaws of the main clamping device 15—against which the end of the workpiece 25 facing the stop can press when the carriage 19 is correspondingly displaced by means of the drive 21. With this embodiment the workpiece 25 can consequently also be handed over in a particular position by the counter clamping device 24 to the main clamping device.

Figure 4:
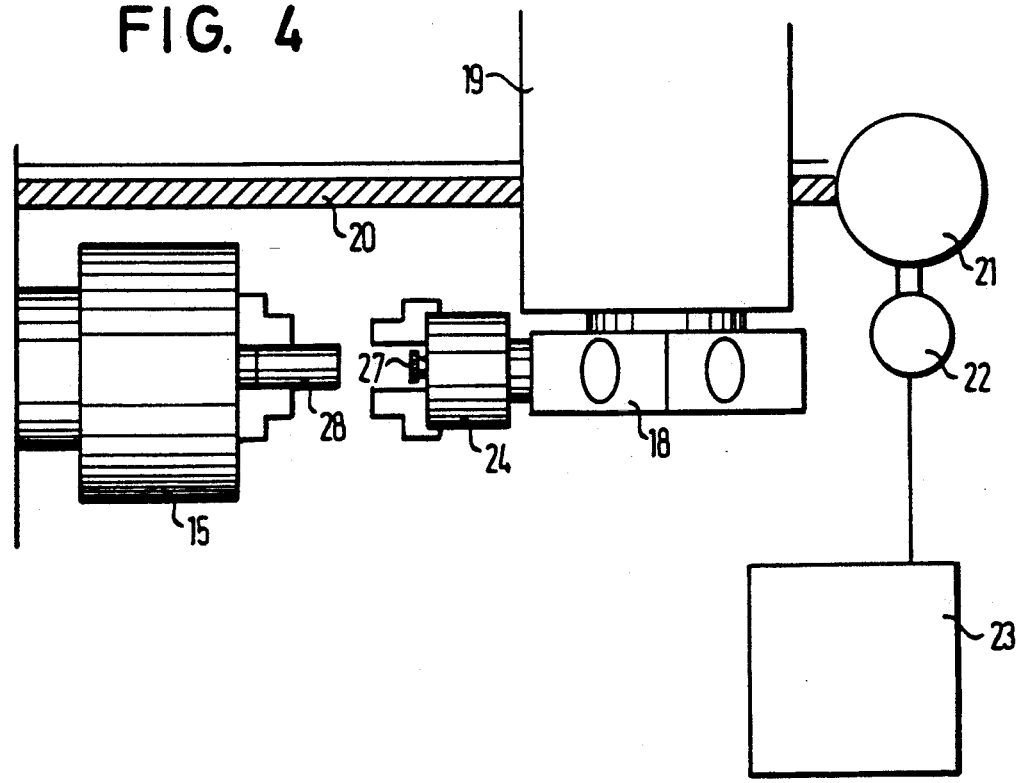

In the embodiment shown in FIG. 4 a counter clamping device 24, preferably arranged on a turret head 18, is arranged opposite the main clamping device 15. In addition a stop 27 is arranged on the counter clamping device 24, on its side facing the main clamping device 15, which is preferably located coaxially in the counter clamping device 24; in this case between its gripping jaws. As with the first exemplary embodiment shown in FIG. 1, it is also possible with this embodiment to monitor the workpiece 28 in the main clamping device 15 with regard to its presence or dimensions or correct positioning. When monitoring in this case the workpiece 28 is clamped between the jaws of the counter clamping device 24 so that the stop 27 can move towards it, whereafter the workpiece 28 is clamped in this position by the counter clamping device 24 and after releasing the main clamping device 15 can be transferred to the counter clamping device 24. Consequently the workpiece 28 can also in this case be transferred in a specified position to the counter clamping device 24.

Within the scope of the invention it is possible to use the process according to the invention with machine tools in which the workpiece or the associated stop is not (only) adjustable by effective adjusting movements along its axis but also by movements that may be at right-angles to this axis (workpiece spindle axis) and can thus be monitored with regard to its presence or dimensions or correct positioning.

Within the scope of the invention it is also possible and advantageous to provide a respective stop 17, 26, 27 on both clamping devices, namely the main clamping device 15 and the counter clamping device 24. This may require a special integrated control device or the respective stop 26, 27 and the associated workpiece 25, 28 can be moved in a controlled manner by a separate control device.

What is claimed is:

1. A method for determining the presence of a workpiece which is clamped in a main clamping device of a numerically controlled machine tool having a displaceable component arranged opposite to said workpiece, said component having a stop connected thereto, said method comprising the steps of:
   (a) selecting a predetermined intended position value for the component such that the stop has a corresponding position value which lies within the workpiece if it is present;
   (b) displacing said component towards said workpiece;
   (c) determining an actual position value of the displaceable component;
   (d) repeating steps (b) and (c) and generating a signal if the intended position value has not been reached and a difference between two successively determined actual position values falls below a predetermined limiting value.

2. A method for determining the presence of a workpiece which is clamped in a main clamping device of a numerically controlled machine tool having a displaceable component arranged opposite to said workpiece, said component having a stop connected thereto, said method comprising the steps of:
   (a) selecting a predetermined intended position value for the component such that the stop has a corresponding position value which lies within the workpiece if it is present;
   (b) displacing said component towards said workpiece;
   (c) determining the actual position value of the displaceable component;
   (d) determining an actual speed value of the displaceable component; and
   (e) repeating steps (b), (c) and (d) and generating a signal if the intended position value has not been reached and either (i) a difference between two successively determined actual speed values is greater than a first predetermined limiting value or (ii) the determined actual speed value is smaller than a second predetermined limiting value.

3. A method for determining the presence of a workpiece which is clamped in a main clamping device of a numerically controlled machine tool having a displaceable component arranged opposite to said workpiece, said component having a stop connected thereto, said method comprising the steps of:
   (a) selecting a predetermined intended position value for the component such that the stop has a corresponding position value which lies within the workpiece if it is present;
   (b) displacing said component towards said workpiece;
   (c) determining the actual position value of the displaceable component;
   (d) determining an actual torque value of the displaceable component; and
   (e) repeating steps (b), (c) and (d) and generating a signal if the intended position value has not been reached and either (i) a difference between two successively determined actual torque values is greater than a first predetermined limiting value or (ii) the determined actual torque value is greater than a second predetermined limiting value.

4. A process according to any one of claims 1 to 3, wherein when a counter clamping device is provided on the displaceable component the stop for the workpiece is arranged in the counter clamping device so that when the counter clamping device is open the stop can be moved towards the workpiece which is held ready to be received.

5. A process according to any one of claims 1 to 3, wherein a dimension of the workpiece is calculated and/or the correct positioning and/or the presence of a workpiece is recognised from the last actual position value of the displaceable component determined before the signal is given and from the known dimensions of the stop for the workpiece and of the displaceable component.

6. A process according to any one of claims 1 to 3, wherein an intended torque value is predetermined for the drive of the displaceable component and the intended torque value is set to a limiting value when the signal is given.

7. A process according to any one of claims 1 to 3, wherein an intended torque value is predetermined for the drive of the displaceable component and the actual torque value is continuously determined repetitively and regulated so that it does not exceed the intended torque value even when the workpiece and the stop contact one another.

8. A method according to any one of claims 1 to 3 wherein upon generation of the signal, an intended position value for the displaceable component is issued which lies before the actual position value by a predetermined amount 9. A method for determining the presence of a workpiece on a numerically controlled machine tool having a main clamping device, a displaceable component arranged opposite to said main clamping device, a counter clamping device for holding the workpiece on the displaceable component and s top mounted on the main clamping device, said method comprising the steps of:
 (a) selecting a predetermined intended position value for the component such that the stop has a corresponding position value which lies within the workpiece if it is present;
 (b) displacing said component towards said main clamping device;
 (c) determining an actual position value of the displaceable component;
 (d) repeating steps (b) and (c) and generating a signal if the intended position value has not been reached and a difference between two successively determined actual position values falls below a predetermined limiting value.

10. A method for determining the presence of a workpiece on a numerically controlled machine tool having a main clamping device, a displaceable component arranged opposite to said main clamping device, a counter clamping device for holding the workpiece on the displaceable component and a stop mounted on the main clamping device, said method comprising the steps of:
 (a) selecting a predetermined intended position value for the component such that the stop has a corresponding position value which lies within the workpiece if it is present;
 (b) displacing said component towards said main clamping device;
 (c) determining an actual position value of the displaceable component;
 (d) determining an actual speed value of the displaceable component; and
 (e) repeating steps (b), (c) and (d) and generating a signal if the intended position value has not been reached and either (i) a difference between two successively determined actual speed values is greater than a first predetermined limiting value or (ii) the determined actual speed value is smaller than a second predetermined limiting value.

11. A method for determining the presence of a workpiece on a numerically controlled machine tool having a main clamping device, a displaceable component arranged opposite to said main clamping device, a counter clamping device for holding the workpiece on the displaceable component and a stop mounted on the main clamping device, said method comprising the steps of:
 (a) selecting a predetermined intended position value for the component such that the stop has a corresponding position value which lies within the workpiece if it is present;
 (b) displacing said component towards said main clamping device;
 (c) determining an actual position value of the displaceable component;
 (d) determining an actual torque value for a drive of the displaceable component;
 (e) repeating steps (b), (c) and (d) and generating a signal if the intended position value has not been reached and either (i) a difference between two successively determined actual torque values is greater than a first predetermined limiting value or (ii) the determined actual torque value is greater than a second predetermined limiting value.

12. A process according to any one of claims 9 to 11, wherein the stop rigidly mounted to the machine is arranged in the main clamping device so that when the main clamping device is open the workpiece can be moved towards it.

13. A process according to any one of claims 9 to 11 wherein, from the last-determined actual position value of the displaceable component before the signal is generated and from the known dimensions of the displaceable component and its clamping device a dimension of the workpiece is calculated, and/or the correct positioning and/or the presence of a workpiece is recognised.

14. A process according to any one of claims 9 to 11, wherein when a signal is given an intended position value for the displaceable component is given which lies before the actual position value, determined on generation of the signal, by a predetermined amount in the direction of movement of the displaceable component.

15. A process according to any one of claims 9 to 11, wherein an intended torque value is predetermined for the drive of the displaceable component and the intended torque value is set to a limiting value on generation of a signal.

16. A process according to any one of claims 9 to 11, wherein an intended torque value is predetermined for the drive of the displaceable component and the actual torque value is continuously determined repetitively and regulated so that it does not exceed the intended torque value even after the workpiece and the stop rigidly mounted to the machine have come into contact.

17. A method for detecting contact between a first and second part of a machine tool, said method comprising the steps of:
 (a) displacing at least one of said first and second parts towards said second or first part respectively;
 (b) determining an actual position value and an actual speed value of the at least one displaceable part;
 (c) determining an actual torque value for a drive which advances the at least one displaceable part towards the other;
 (d) repeating steps (b) and (c) and generating a signal to indicate contact between said first and second parts when (i) a difference between two successively determined actual position values is smaller than a first predetermined limiting value (ii) the actual speed value is smaller than a second predetermined limiting value, (iii) a difference between two successively determined actual torque values is greater than a third predetermined limiting value, or (iv) the actual torque value for the drive of the at least one displaceable part exceeds a fourth predetermined limiting value.

* * * * *